(12) United States Patent
Brewer et al.

(10) Patent No.: US 7,374,494 B2
(45) Date of Patent: May 20, 2008

(54) FLUID CONNECTOR

(75) Inventors: Robert Brewer, Westland, MI (US); Gerard Jakuszeski, Oxford, MI (US)

(73) Assignee: MacLean-Fogg Company, Mudelein, IL (US)

( * ) Notice: Subject to any disclaimer, the term of this patent is extended or adjusted under 35 U.S.C. 154(b) by 0 days.

(21) Appl. No.: 10/993,684

(22) Filed: Nov. 19, 2004

(65) Prior Publication Data
US 2005/0103084 A1    May 19, 2005

Related U.S. Application Data

(62) Division of application No. 10/177,310, filed on Jun. 21, 2002, now Pat. No. 7,017,952.

(51) Int. Cl.
*B21H 3/02* (2006.01)

(52) U.S. Cl. .............................. 470/12; 470/8; 470/16

(58) Field of Classification Search ............... 72/88, 72/90; 470/8, 9, 10, 11, 12, 16, 63, 66, 84; 411/418, 419, 420, 421
See application file for complete search history.

(56) References Cited

U.S. PATENT DOCUMENTS

| 45,133 A | 11/1864 | Bonwill |
|---|---|---|
| 142,112 A | 8/1873 | Coming et al. |
| 185,936 A | 1/1877 | Landfear |
| 324,487 A | 8/1885 | Rice |
| 429,857 A | 6/1890 | Ericson |
| 453,563 A | 6/1891 | Nicholson |
| 497,510 A | 5/1893 | Adler |
| 594,330 A | 11/1897 | Cox, Jr. |
| 1,000,280 A | 8/1911 | Messenger |
| 1,011,398 A | 12/1911 | Andregg |
| 1,048,590 A | 12/1912 | Russell |
| 1,088,892 A | 3/1914 | Foreman |
| 1,201,944 A | 10/1916 | Dods |
| 1,235,626 A * | 8/1917 | Woodward ................. 411/421 |

(Continued)

FOREIGN PATENT DOCUMENTS

JP    7-317741 A    12/1995

(Continued)

OTHER PUBLICATIONS

Wang, Rui, Office Action from Chinese Patent Office for Chinese Patent Application No. 03819851, May 11, 2007. Pages 1-5, Chinese Patent Office.

*Primary Examiner*—Ed Tolan
(74) *Attorney, Agent, or Firm*—Dana Andrew Alden

(57) ABSTRACT

The present invention relates to a method for manufacturing a bolt that includes an axis, including the steps of providing a metal rod, providing a die, extruding the metal rod through use of the die, cold forming the metal rod, at least in part, to provide a shaft and a head so that, the head includes a torque transferring structure, the head includes a flange located adjacent to the torque transferring structure, a generally cylindrical surface is located adjacent to the flange, and a sloping surface that extends from the generally cylindrical surface towards the axis, rolling a threaded surface into the shaft, and providing a plurality of grooves so that the grooves extend from an end of the bolt.

17 Claims, 6 Drawing Sheets

U.S. PATENT DOCUMENTS

| | | | | |
|---|---|---|---|---|
| 1,288,893 | A | 12/1918 | Holmes | |
| 1,294,268 | A | 2/1919 | Holmes | |
| 1,406,315 | A | 2/1922 | Whittaker | |
| 1,465,148 | A | 8/1923 | Rosenberg | |
| 1,708,793 | A | 4/1929 | Jones | |
| 1,855,372 | A * | 4/1932 | White | 72/647 |
| 1,862,486 | A | 8/1932 | Trotter | |
| 1,909,477 | A | 5/1933 | Trotter | |
| 1,911,180 | A * | 5/1933 | Corlett | 470/31 |
| 1,963,542 | A | 6/1934 | Bergstrom | |
| 1,971,917 | A * | 8/1934 | Newton | 470/10 |
| 2,160,706 | A | 5/1939 | Olson | |
| 2,165,011 | A | 7/1939 | Rosenberg | |
| 2,165,149 | A | 7/1939 | Olson | |
| 2,200,227 | A | 5/1940 | Olson | |
| 2,232,237 | A | 2/1941 | Meersteiner | |
| 2,276,411 | A | 4/1942 | Braendel | |
| 2,293,930 | A | 8/1942 | Braendel | |
| 2,302,675 | A * | 11/1942 | Cherry | 411/421 |
| 2,314,897 | A | 3/1943 | Purinton | |
| 2,314,898 | A | 3/1943 | Purinton | |
| 2,330,869 | A * | 10/1943 | Cherry | 72/90 |
| 2,342,170 | A | 2/1944 | Tinnerman | |
| 2,407,160 | A | 9/1946 | Kohn | |
| 2,428,783 | A | 10/1947 | Cole | |
| 2,510,203 | A | 6/1950 | Anderson | |
| 2,562,516 | A | 7/1951 | Williams | |
| 3,384,394 | A | 5/1968 | O'Connor | |
| 3,384,911 | A * | 5/1968 | Carlson | 470/9 |
| 3,418,012 | A | 12/1968 | La Torre | |
| 3,481,178 | A | 12/1969 | Wilkins | |
| 3,492,908 | A | 2/1970 | Thurston | |
| 4,259,758 | A * | 4/1981 | Owen | 470/10 |
| 4,488,843 | A | 12/1984 | Achille | |
| 4,697,969 | A * | 10/1987 | Sparkes | 411/387.7 |
| 4,867,625 | A | 9/1989 | Dixon | |
| 4,966,024 | A * | 10/1990 | Hewison | 72/88 |
| 4,978,350 | A | 12/1990 | Wagenknecht | |
| 5,061,132 | A * | 10/1991 | Cosenza | 411/3 |
| 5,094,143 | A | 3/1992 | Andersen, Jr. | |
| 5,110,245 | A | 5/1992 | Hiroyuki | |
| 5,228,725 | A | 7/1993 | Aoyagi et al. | |
| 5,234,291 | A | 8/1993 | Swemmer | |
| 5,242,253 | A | 9/1993 | Fulmer | |
| 5,395,195 | A | 3/1995 | Fulmer | |
| 5,407,312 | A * | 4/1995 | Terrizzi | 411/304 |
| 5,622,074 | A | 4/1997 | Cushman | |
| 5,667,348 | A | 9/1997 | Chen et al. | |
| 5,674,035 | A | 10/1997 | Hettich et al. | |
| 5,702,443 | A | 12/1997 | Br.ang.nemark | |
| 5,810,670 | A * | 9/1998 | Yamamuro et al. | 470/12 |
| 5,947,668 | A | 9/1999 | Thommes | |
| 5,980,177 | A | 11/1999 | Schiess et al. | |
| 6,007,109 | A | 12/1999 | Schoetz | |
| 6,106,208 | A | 8/2000 | Lin | |
| 6,149,363 | A | 11/2000 | March | |
| 6,290,445 | B1 | 9/2001 | Duran et al. | |
| 6,499,925 | B2 | 12/2002 | Duran et al. | |
| 6,503,038 | B2 * | 1/2003 | McGough | 411/424 |
| 6,588,999 | B2 | 7/2003 | Kubler et al. | |
| 6,860,689 | B1 | 3/2005 | Attanasio | |
| 6,878,069 | B2 * | 4/2005 | Swim, Jr. | 470/10 |
| 2003/0108403 | A1 | 6/2003 | Van Scoyoc | |

FOREIGN PATENT DOCUMENTS

| | | |
|---|---|---|
| JP | 21411 | 1/1997 |
| JP | H9-21411 | 1/1997 |

* cited by examiner

FLUID CONNECTOR

This application of a divisional of prior application Ser. No. 10/177,310, now U.S. Pat. No. 7,017,952 filed Jun. 21, 2002, the disclosure of which is hereby incorporated herein by reference.

FIELD OF THE INVENTION

This invention relates to bolts that are threaded and provided with grooves.

BACKGROUND OF THE INVENTION

Bolts, as known in the art, are provided with external threads; however, they do not typically include grooves. The present invention is directed at novel methods for manufacturing a threaded bolt that includes a plurality of grooves.

SUMMARY OF THE INVENTION

The scope of the present invention is defined solely by the appended claims, and is not affected to any degree by the statements within this summary. Briefly stated, a method for manufacturing a bolt that includes an axis, including the steps of providing a metal rod, providing a die, extruding the metal rod through use of the die, cold forming the metal rod, at least in part, to provide a shaft and a head so that, the head includes a torque transferring structure, the head includes a flange located adjacent to the torque transferring structure, a generally cylindrical surface is located adjacent to the flange, and a sloping surface that extends from the generally cylindrical surface towards the axis, rolling a threaded surface into the shaft, and providing a plurality of grooves so that the grooves extend from an end of the bolt.

DETAILED DESCRIPTION OF THE PRESENTLY PREFERRED EMBODIMENTS

Figure 1:
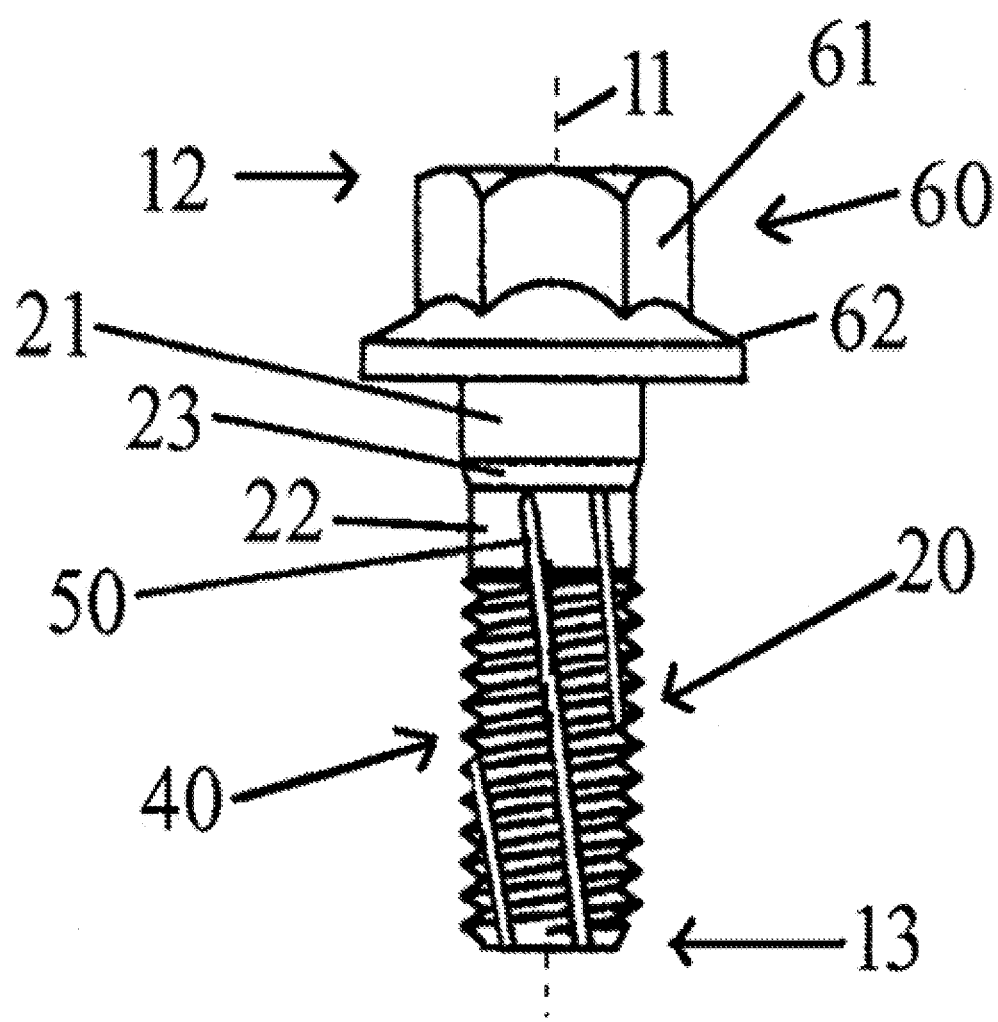
FIG. 1 depicts a preferred embodiment of a fluid connector.
Figure 2:
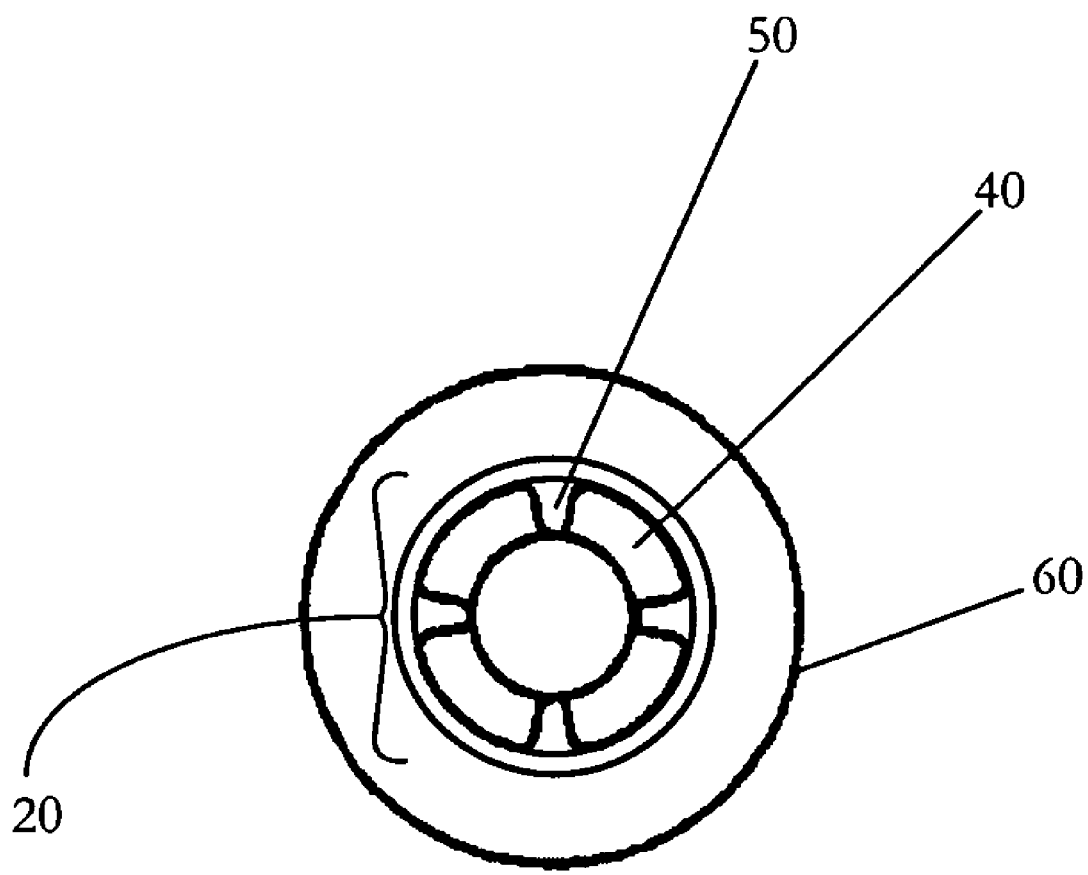
FIG. 2 depicts the bottom view of the preferred embodiment of a fluid connector seen in FIG. 1.

Turning now to the drawings, FIGS. 1 and 2 show a fluid connector 10 in the form of a bolt constituting a preferred embodiment of the present invention. The bolt 10 is composed of a metal, preferably aluminum. According to one aspect of the present invention, the metal is copper. According to another aspect of the present invention, the metal is iron.

Those skilled in the art will appreciate that the metal is an alloy. According to one aspect of the present invention, the metal includes ferrous and non-ferrous materials. According to another aspect of the present invention, the metal is a steel. Those skilled in the art will appreciate that steel is in a plurality of formulations, such as stainless steel. According to one embodiment of the present invention the steel is a low carbon steel. In another embodiment of the present invention, the steel is a medium carbon steel. According to yet another embodiment of the present invention, the steel is a high carbon steel.

Those with skill in the art will also appreciate that the metal is a super alloy. According to one aspect of the present invention, the super alloy is bronze; according to another aspect of the present invention, the super alloy is a high nickel material. According to yet another aspect of the present invention, the bolt 10 is composed of martensitic material. According to still another aspect of the present invention, the bolt 10 is composed of austenitic material. According to another aspect of the present invention, the metal is a ferritic material.

The bolt 10 includes, an axis 11, a first end 12, and a second end 13. Located between the first and second ends 12, 13 are a shaft 20 and a head 60. The shaft 20 is composed of at least one of a plurality of shaft sections. According to one aspect of the present invention, the shaft section is cylindrical in shape. According to another aspect of the present invention, a shaft section is frusto-conical in shape. According to yet another aspect of the present invention, the shaft sections are solid. According to still another aspect of the present invention, the shaft sections are hollow.

FIG. 1 depicts the preferred embodiment of the present invention wherein the bolt shaft 20 is composed of a plurality of shaft sections 21, 22, 23 and 40. The shaft 20 includes an upper cylindrical shaft section 21, a lower cylindrical shaft section 22, an intermediate frusto-conical shaft section 23 and a threaded shaft section 40. In the preferred embodiment, the upper cylindrical shaft section 21 is joined to the lower cylindrical shaft section 22 via the frusto-conical shaft section 23.

The bolt shaft 20 of the present invention is provided with a plurality of connector surfaces. The cylindrical shaft section 22 has an unthreaded surface, as does the cylindrical shaft section 21. The cylindrical shaft 22 has a smaller diameter than the shaft section 21. The shaft section 40 below the shaft section 22 is externally threaded, as illustrated. The shaft section 23 is provided with an external surface that slopes radially toward the axis 11. In the embodiment depicted, the shaft section 23 extends from the shaft section 21 to the shaft section 22.

FIG. 1 depicts the preferred embodiment bolt 10 of the present invention composed of a plurality of connector surfaces. FIG. 2 depicts a bottom view of the preferred embodiment bolt 10 of the present invention. The lower cylindrical shaft section 22 and the externally threaded shaft section 40 have a plurality of grooves 50 formed into their outer surfaces and extending longitudinally from the frusto-conical section 23 to the free end of the threaded section 40. In the bolt 10 there are four such grooves 50 extending spirally and spaced from each other around the shaft 20.

The connector surfaces of the present invention perform a plurality of functions. The threads of the section 40 functions to fasten the bolt 10 to another structure. This function is accomplished through the interaction of the threads and cooperating threads of another structure (not shown).

In use of the bolt 10, the grooves 50 functions to channel fluid from around the section 22 of the shaft 20 to the free end of the shaft. This function is accomplished with at least one groove 50, although more are preferred, as illustrated here.

The bolt 10 is fabricated through a plurality of processes. According to one aspect of the present invention, the bolt 10 is machined. According to another aspect of the present invention, the bolt 10 is hot formed or forged. According to yet another aspect of the present invention, the bolt 10 is fabricated through casting. The preferred embodiment of the bolt is cold formed (also known as "cold head").

The process of cold forming the preferred embodiment begins with a metal wire or metal rod which is drawn to size. After being drawn to size, the wire or rod is upset by being run through a series of dies or extrusions. After the wire has been through a series of dies or extrusions, it has been changed to a semi-formed state. In this semi-formed state, the metal is rolled so that a surface with at least one groove 50 is formed. In the preferred embodiment, a plurality of grooves 50 are rolled into the shaft 20 so that they from spirals. Those skilled in the art will appreciate that a plurality of grooves 50 can be fabricated so that they are straight and do not form a spiral however, and, furthermore, that the grooves can be fabricated with any degree of spiral.

While the preferred embodiment depicted in FIG. 1 illustrates grooves 50 fabricated through rolling, those skilled in the art will appreciate that a groove or grooves may be fabricated in other ways. The grooves of the present invention are not limited to fabrication through rolling. As used herein, a groove is any structure which allows for fluid on a connector surface.

After a plurality of grooves 50 have been impressed into the surface, threads are formed on the surface of the shaft section 40 through a similar rolling process. In the preferred embodiment, threads are rolled to a depth which is half the depth of the grooves 50.

Those skilled in the art will appreciate that the groove and the threads can be made through machining or drilling with a different ratio of relative depths. Furthermore, those skilled in the art will appreciate that the present invention can be threaded first and then rolled to form the groove.

As shown in FIG. 1, the bolt 10 includes a head 60 that is located adjacent to a flange 62. The presently preferred embodiment includes a head 60 that is provided with generally a polygonal shaped torque transferring structure 61. As used herein, a torque transferring structure 61 is any structure which allows a torque to be transferred to shaft 20 of the present invention. The torque transferring structure 61 is used to rotate the shaft 20 and tighten or loosen the threaded connection between the present invention and another structure. Alternatively, the torque transferring structure 61 is a recessed area, such as will fit a screw driver (see FIG. 4).

Those skilled in the art will appreciate that torque may be transferred via any of a plurality of structures and that any such structure can be used without departing from the spirit of the present invention. Any structure which allows a torque to be transferred to the shaft 20 of the present invention is a torque transferring structure within the scope of the present invention.

Figure 3:
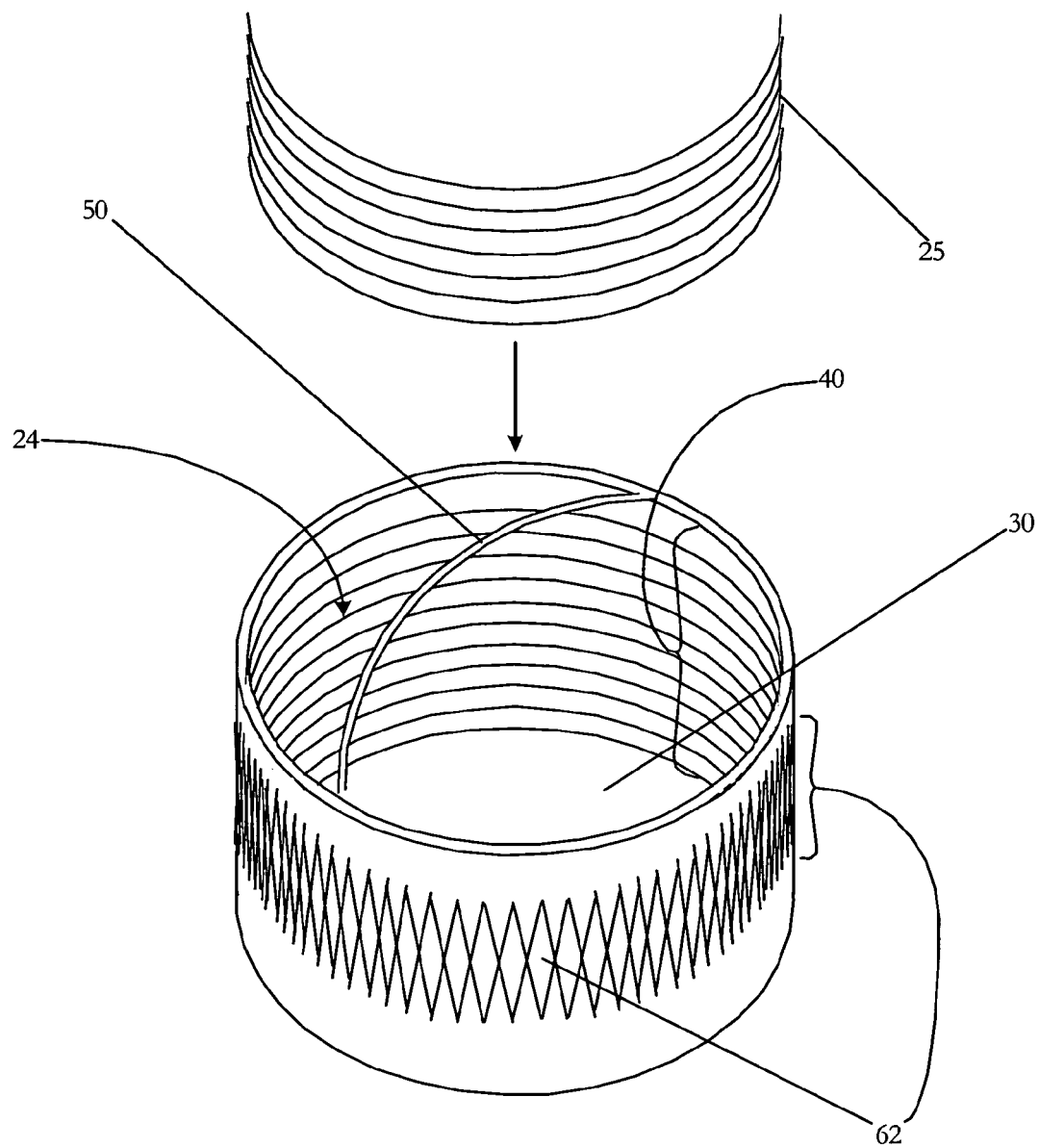
FIG. 3 depicts an alternative embodiment of a fluid connector.
Figure 4:
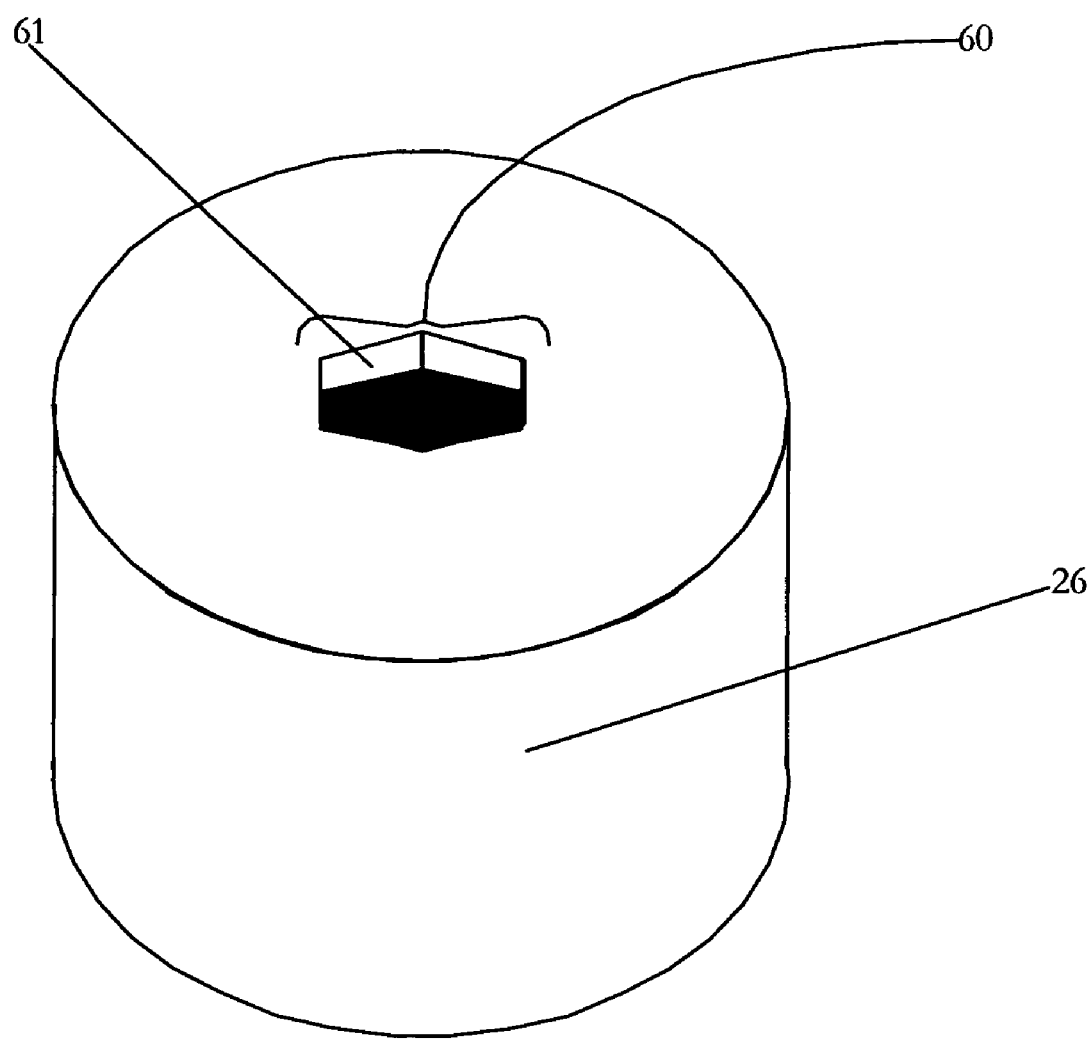
FIG. 4 depicts a view of the outside of a second embodiment of a fluid connector.

FIG. 3 depicts the hollow shaft element of an alternative embodiment of the present invention. In the alternative embodiment of FIG. 3, a surface with a plurality of threads 40 defines an inner section 24 which accommodates a threaded rod 25. Within the surface with a plurality of threads 40, a groove 50 is provided through which fluid flows. As depicted in FIG. 3, the alternative embodiment is preferably provided with a torque transferring structure 60, which is in the form of a roughened gripping surface 62. However, as noted above, those skilled in the art will appreciate that torque may be transferred through other structures, such as a recessed area 61, as depicted in FIG. 4 and previously discussed. FIG. 4 depicts the outer surface 26 of the hollow shaft element of the alternative embodiment of the present invention with an alternative torque transferring structure 60.

Figure 5:
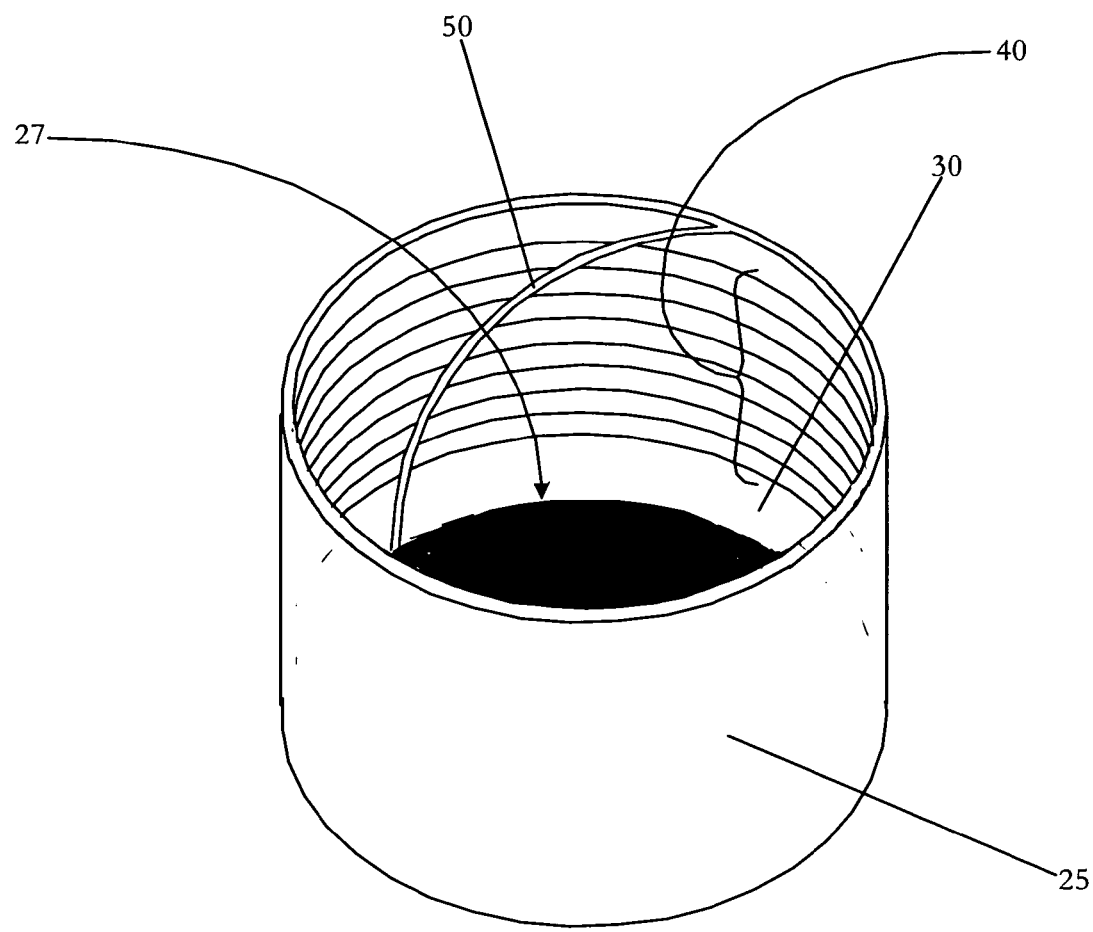
FIG. 5 depicts a third embodiment of a fluid connector.

FIG. 5 depicts a second alternative embodiment of the present invention. As illustrated in FIG. 5, a surface with a plurality of threads 40 defines an inner section 24 which accommodates a threaded rod. Within the surface with a plurality of threads 40, a groove is provided through which fluid flows. In the alternative embodiment depicted in FIG. 5, an opening 27 is provided which accommodates a fluid conveying structure, such as a nozzle (not shown). Those skilled in the art will appreciate that the opening 27 may be defined in the outer surface 26. As illustrated in FIG. 5, the inner section 24 accommodates a threaded rod.

Figure 6:
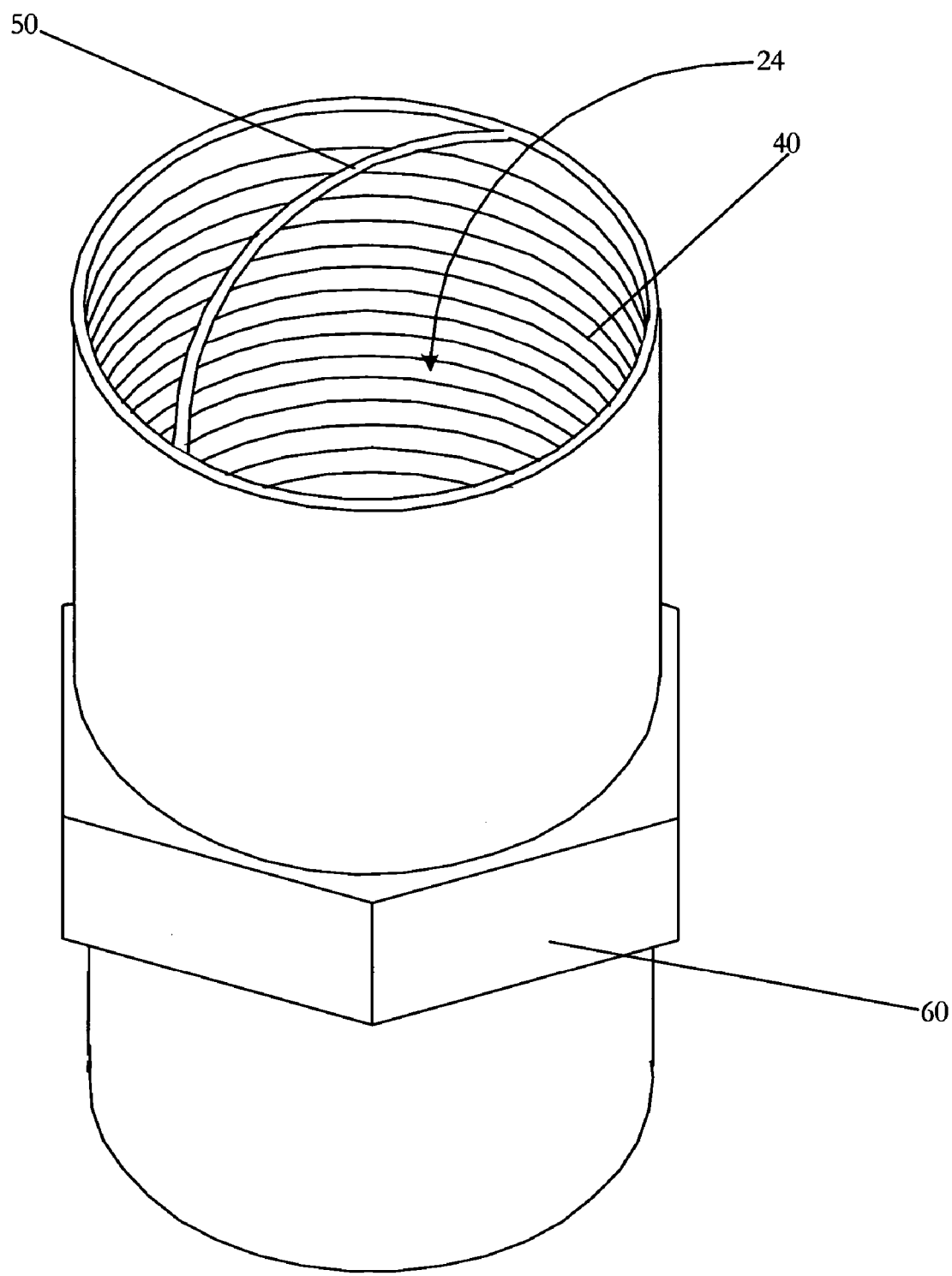
FIG. 6 depicts a fourth embodiment of a fluid connector.

FIG. 6 depicts a third alternative embodiment of the present invention configured as a coupler 11. The coupler 11 depicted in FIG. 6 is composed of an outer surface 26 and a surface with a plurality of threads 40 which defines an inner section 24. The inner section 24 accommodates at least one threaded rod 25, preferably two threaded rods. Within the threaded surface 40, a groove 50 is provided through which fluid flows. As depicted in FIG. 6, the coupler 11 is preferably provided with a torque transferring structure 60.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A method for fabricating a bolt that includes an axis, comprising the steps of:
 a) providing a metal rod;
 b) providing a die;
 c) extruding the metal rod through use of the die;
 d) cold forming the metal rod, at least in part, to provide a shaft and a head so that:
  i) the head includes a torque transferring structure;
  ii) the head includes a flange located adjacent to the torque transferring structure;
  iii) a generally cylindrical surface is located adjacent to the flange;
  iv) a sloping surface that extends from the generally cylindrical surface towards the axis;
 e) rolling a threaded surface into the shaft; and
 f) providing a plurality of grooves so that the grooves extend from an end of the bolt.

2. A method for fabricating a bolt according to claim 1, wherein the metal rod includes a low carbon steel.

3. A method for fabricating a bolt according to claim 1, further comprising the step of locating the sloping surface between the generally cylindrical surface and the threaded surface.

4. A method for fabricating a bolt that includes an axis, comprising the steps of:
 a) providing a metal rod;
 b) providing a die;
 c) extruding the metal rod through use of the die;
 d) cold forming the metal rod, at least in part, to provide a shaft and a head so that:
  i) the head includes a torque transferring structure;
  ii) the head includes a flange located adjacent to the torque transferring structure;
  iii) a first generally cylindrical surface is located adjacent to the flange;
  iv) a second generally cylindrical surface is provided on the bolt;

v) a sloping surface extends towards the axis and is located between the first generally cylindrical surface and the second generally cylindrical surface;
e) providing a threaded surface located adjacent to the second generally cylindrical surface; and
f) providing a plurality of grooves so that the grooves extend from an end of the bolt.

5. The method for fabricating a bolt according to claim 4, wherein the metal rod is cold formed, at least in part, to provide the shaft and the head so that the sloping surface is located adjacent to the first generally cylindrical surface and the second generally cylindrical surface.

6. The method for fabricating a bolt according to claim 4, wherein the second generally cylindrical surface is provided with a diameter that is smaller than a diameter of the first generally cylindrical surface.

7. The method for fabricating a bolt according to claim 4, wherein:
a) the metal rod is cold formed, at least in part, to provide the shaft and the head so that the sloping surface is located adjacent to the first generally cylindrical surface and the second generally cylindrical surface; and
b) the second generally cylindrical surface is provided with a diameter that is smaller than a diameter of the first generally cylindrical surface.

8. A method for fabricating a bolt according to claim 4, wherein the metal rod includes a low carbon steel.

9. A method for fabricating a bolt that includes an axis, comprising the steps of:
a) providing a metal rod;
b) providing a die;
c) extruding the metal rod through use of the die;
d) cold forming the metal rod, at least in part, to provide a shaft and a head so that:
i) the head includes a torque transferring structure;
ii) the head includes a flange located adjacent to the torque transferring structure;
iii) a first generally cylindrical surface is located adjacent to the flange;
iv) a second generally cylindrical surface is provided on the bolt;
v) a surface that slopes radially from the second generally cylindrical surface is located between the first generally cylindrical surface and the second generally cylindrical surface;
e) providing a threaded surface adjacent to the second generally cylindrical surface; and
f) providing a plurality of grooves so that the grooves extend from an end of the bolt.

10. The method for fabricating a bolt according to claim 9, wherein the second generally cylindrical surface is provided with a diameter that is smaller than a diameter of the first generally cylindrical surface.

11. The method for fabricating a bolt according to claim 9, wherein the metal rod is cold formed, at least in part, to provide the shaft and the head so that the sloping surface is located adjacent to the first generally cylindrical surface and the second generally cylindrical surface.

12. The method for fabricating a bolt according to claim 9, wherein:
a) the metal rod is cold formed, at least in part, to provide the shaft and the head so that the sloping surface is located adjacent to the first generally cylindrical surface and the second generally cylindrical surface; and
b) the second generally cylindrical surface is provided with a diameter that is smaller than a diameter of the first generally cylindrical surface.

13. The method for fabricating a bolt according to claim 9, wherein the metal rod is cold formed, at least in part, to provide the shaft and the head so that the sloping surface extends radially from the second generally cylindrical surface to the first generally cylindrical surface.

14. The method for fabricating a bolt according to claim 9, wherein:
a) the metal rod is cold formed, at least in part, to provide the shaft and the head so that the sloping surface extends radially from the second generally cylindrical surface to the first generally cylindrical surface; and
b) the second generally cylindrical surface is provided with a diameter that is smaller than a diameter of the first generally cylindrical surface.

15. The method for fabricating a bolt according to claim 9, wherein the metal rod is cold formed, at least in part, to provide the shaft and the head so that the sloping surface extends radially from the second generally cylindrical surface to the first generally cylindrical surface and is located adjacent to the first generally cylindrical surface and the second generally cylindrical surface.

16. The method for fabricating a bolt according to claim 9, wherein:
a) the metal rod is cold formed, at least in part, to provide the shaft and the head so that the surface extends radially from the second generally cylindrical surface to the first generally cylindrical surface and is located adjacent to the first generally cylindrical surface and the second generally cylindrical surface; and
b) the second generally cylindrical surface is provided with a diameter that is smaller than a diameter of the first generally cylindrical surface.

17. A method for fabricating a bolt according to claim 9, wherein the metal rod includes a low carbon steel.

* * * * *